United States Patent
Stiegler et al.

(10) Patent No.: US 7,280,051 B2
(45) Date of Patent: *Oct. 9, 2007

(54) TRANSMISSION AND RECEPTION OF A DECOMPOSED DIGITIZED SIGNAL

(75) Inventors: Andreas Stiegler, Ettlingen (DE); Harald Schöpp, Ettlingen (DE); Frank Bähren, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/480,758

(22) Filed: Jul. 3, 2006

(65) Prior Publication Data

US 2007/0063878 A1  Mar. 22, 2007

Related U.S. Application Data

(63) Continuation of application No. 10/007,677, filed on Nov. 13, 2001, now Pat. No. 7,071,861.

(30) Foreign Application Priority Data

Nov. 10, 2000 (DE) .................. 100 55 939

(51) Int. Cl.
*H03M 7/00* (2006.01)
(52) U.S. Cl. .................. 341/50; 341/155; 710/66
(58) Field of Classification Search ........ 341/155; 704/201; 710/66, 69
See application file for complete search history.

(56) References Cited

U.S. PATENT DOCUMENTS

| | | | | | |
|---|---|---|---|---|---|
| 5,257,288 | A | * | 10/1993 | Moser | 375/242 |
| 5,768,546 | A | * | 6/1998 | Kwon | 710/307 |
| 5,905,756 | A | * | 5/1999 | Lamkin et al. | 375/222 |
| 6,046,692 | A | | 4/2000 | Yamashiro et al. | 341/155 |
| 6,076,122 | A | * | 6/2000 | Fujii | 710/69 |
| 6,839,013 | B1 | * | 1/2005 | Cummins et al. | 341/155 |

FOREIGN PATENT DOCUMENTS

| | | | |
|---|---|---|---|
| DE | 3604835 A1 * | 8/1987 | |
| EP | 0859 493 | 1/1998 | ........ 25/2 |
| JP | 62245356 A * | 10/1987 | |
| JP | 04236650 A * | 8/1992 | |

OTHER PUBLICATIONS

Teichner, D. "Netzwerk-Konzepte Fuer Video-Und Audiofunktionen Im Auto", Fernsed und Kinotechnik, Bd. 54, Nr. 3, Mar. 2000.

* cited by examiner

*Primary Examiner*—Howard L. Williams
(74) *Attorney, Agent, or Firm*—O'Shea, Getz & Kosakowski, P.C.

(57) ABSTRACT

A voice signal is transmitted in an MOST network on a single channel. The width of the transmitted voice data words is preferably up to 14 bits, and each voice data word is transmitted into successive clock periods of the MOST network, in a byte that includes seven bits of the voice data word and one identifier bit.

17 Claims, 3 Drawing Sheets

TRANSMISSION AND RECEPTION OF A
DECOMPOSED DIGITIZED SIGNAL

PRIORITY INFORMATION

This application is a continuation of Ser. No. 10/007,677 filed Nov. 13, 2001 now U.S. Pat. No. 7,071,861.

BACKGROUND OF THE INVENTION

The present invention relates to data transmission systems, and in particular to the transmission and reception of digitized data between components of a motor vehicle data network.

The transmission of digitized signals, especially in real time, often encounters the problem that the rate at which the digitized data are generated and their resolution (i.e., the number of bits of their data values) are poorly matched to a given transmission infrastructure. Many data transmission systems, especially multiplexed systems, manage their transmission capacity in the form of channels, which are characterized by an operating frequency and a word width. If this word width is less than that of a transmitted digitized signal, several channels must be provided to transmit the signal, even if the quantity of data transmitted per unit time might find room in one channel.

A typical example of such a problem is the transmission of voice signals on a Media Oriented Systems Transport (MOST) bus system. The MOST bus includes an optical bus system that is used in motor vehicles for the transmission of data that are not directly specific to the operation of the motor vehicle. Such data can include, for example, audio and/or video signals of a car radio or car telephone, or navigation signals for a GPS system.

The MOST specification provides for a bus system with a ring structure for synchronous data transmission with a uniform system clock pulse of 44.1 kHz. Frames are transmitted on the ring bus at this frequency, and each frame contains a plurality of bytes. These bytes, which always recur at the system cycle of 44.1 kHz, are also referred to as channels. Every data source connected to the ring bus uses a certain number of such channels to send and/or receive data.

According to the MOST specification, four bytes per frame (i.e., four channels) are specified for the transmission of audio signals. This bandwidth is necessary for high-grade stereo transmission of arbitrary audio signals. However, due to the limited frequency spectrum of the human voice, the transmission of signals representing human voice requires less bandwidth. Especially in the case of a telephone voice signal, which is transmitted monophonically, the data transmitted on the MOST bus are always pairwise the same. Thus the MOST bus is used rather inefficiently for voice transmission data.

Therefore, there is a need for a technique for transmitting data such as voice data between components of a vehicle data network.

SUMMARY OF THE INVENTION

The utilization of the capacity of a transmission system is improved in the event that the operating frequency and channel width of the system do not match the word frequency and word width of the digitized signal. The data words of the digitized signal are decomposed into partial words with a smaller width than that of the channels on which they are transmitted. Consequently, in each individual channel there remains a residual transmission capacity that makes it possible to transmit an identifier for each individual transmitted partial data word. A data sink, connected to the transmission system, uses this identifier to obtain information about the position of the respective partial data word in its original data word.

This identifier may be one bit (i.e., a Boolean signal). Even if the number of partial data words into which each original data word is decomposed may be greater than two, a single bit is sufficient for example to distinguish every first or every last partial data word from all the other partial data words of a data word, and thus to deliver to the sink a fixed point from which it can begin to reconstruct the original data words.

For example, a transmission system may have the ratio "a" of the operating frequency of the channel to the word frequency of the digitized signal equal to two. If it is also assumed that the 8-bit channels have a width "m," then economical transmission of voice signals in an MOST network are enabled.

MOST networks presently operate at an operating frequency or frame frequency of 44.10 kHz. However, since the frequency spectrum of the human voice generally does not extend beyond 11 kHz, a sampling frequency of only 22 kHz is required. Therefore, sampling voice signals at 22.05 kHz which is one-half of the MOST operating frequency is acceptable.

Commercial analog-to-digital converters (ADCs) typically have a resolution of twelve or sixteen bits. The data words of a digitized signal with twelve-bit width, including an identifier, can be transmitted on two channels of a transmission system, where each channel is eight bits wide. However, part of the transmission capacity of the system would remain unutilized. Relatively complete utilization of the transmission capacity is achieved if the data words are fourteen bits wide. Such a digitized signal can be generated by sixteen-bit converters, since the sampled sixteen bit signal can be truncated to a width of fourteen bits.

A sampled sixteen bit signal is converted into partial data words each having an identifier and suitable for transmission, by shifting bits 2 to 8 the 16-bit sampled datum one bit to the right (the bits of the sampled datum are numbered 0 to 15, where bit 0 is the least significant bit). This results in a transformed data word, whose bits 15 to 9 coincide with those of the original sampled datum, whereas bits 7 to 1 respectively have the values of bits 8 to 2 of the sampled datum. Bits 8 and 0 are set to the values of 1 and 0, respectively. The two bytes of the transformed data word can now be transmitted on one channel in two successive frames, such that one frame contains the more significant byte with bits 15 to 8 and another frame contains the less significant byte with bits 7 to 0. The least significant bit in each of these two bytes defines each byte as the first or second partial word.

When the transmitted data are recovered at the sink, the shift operation is reversed. The sink checks the least significant bit of each received byte to determine if the byte is the least significant or most significant byte of the transformed data word, and is thus able to reconstitute the transformed data word with the correct sequence of bytes.

The sink receives the sampled data of a voice signal at half the clock pulse rate of the MOST network. To transmit sampled data at the full MOST clock pulse rate of 44.1 kHz to a subordinate unit, the sink transmits each received data word of the voice signal twice.

To reduce garbling of the voice signal received by the subordinate unit, the sink transmits the voice signal through a low-pass filter.

A data source may include a logic circuit to shift bits 2 to 8 of a 16-bit voice data word by one bit to the right and to enter an identifier, as the first or second partial word, in the lowest significant bit of each of the two bytes of the resulting data word.

A complementary data sink is characterized by a logic circuit to recombine two received bytes of voice data into one 16-bit-wide data word, and to shift the less significant byte of the data word by one bit to the left.

Advantageously, the apparatus and method allow sampled voice data to be transmitted more efficiently in a MOST data network.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
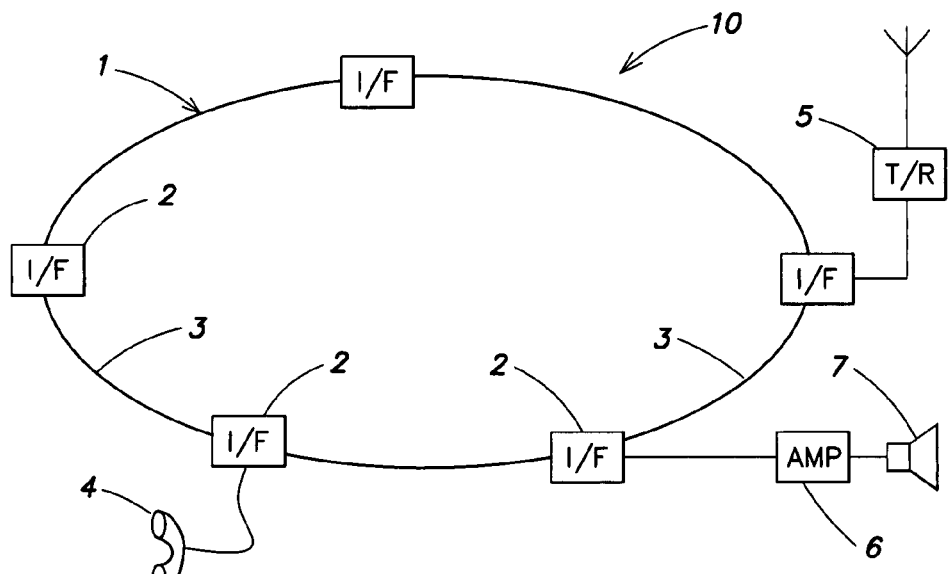
FIG. 1 is a block diagram illustration of a MOST ring network.

FIG. 1 is a block diagram illustration of a MOST ring network 10. The network 10 includes a ring-shaped bus 1, whose various component sections 3 link a number of interface units 2. The interface units 2 function as data sources or data sinks that transparently forward data that are not intended for them. Various data processing devices, such as for example, a computer of a navigation system, a radio or television receiver, or the like, or a handset 4 of a mobile telephone and its wireless transmitter/receiver unit 5 can be connected to bus 1 through their respective interface units 2. The radio, radio or television receiver, also a hands-free device of the mobile telephone can share via the bus 1 access to an amplifier 6 with a connected loudspeaker 7. The handset 4 and the transmitter/receiver unit 5 exchange voice signals with one another and in some circumstances with the amplifier 6 via the hands-free device.

A data transmission from the handset 4 (i.e., a data source) to the transmitter/receiver 5 (i.e., a data sink) is disclosed. However, any number of transmission paths can utilize the data processing disclosed herein (e.g., transmissions from the handset 4 or the transmitter/receiver unit 5 to the amplifier 6).

The handset 4 delivers to its interface unit 2 a sampled voice signal for example in the form of 16-bit-wide data words with a clock pulse rate of 22.05 MHz, corresponding to the half-frame frequency of the MOST bus. Therefore, the frequencies have a ratio of "a" equal to two (i.e., "a"=2).

Figure 2A:
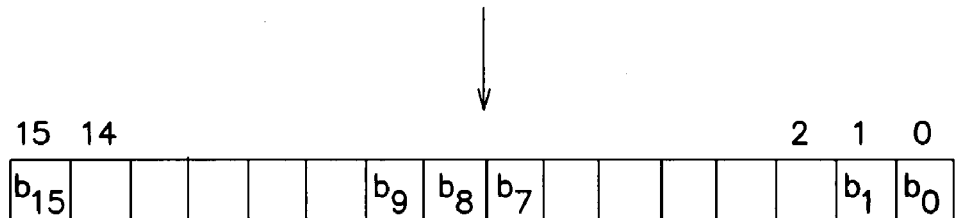
FIGS. 2A-2E illustrate various partitioning and bit manipulation stages of transmitted and received data.

FIG. 2A illustrates the sixteen-bit sampled voice signal from the handset 4. The signals include bits 0 to 15, containing the values $b_0$ to $b_{15}$, respectively, where bit 0 is the least significant bit.

Figure 2B:
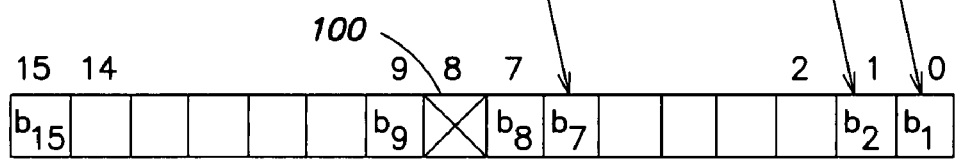
Figure 2C:
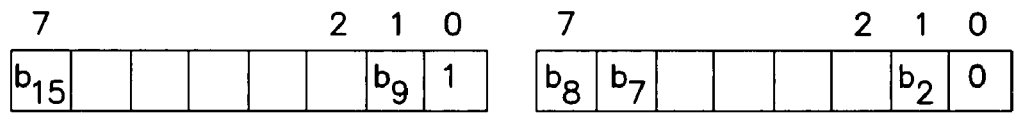

FIG. 2B illustrates the sixteen-bit sampled voice signal following the shifting of bits 1 to 8 to the right by the interface unit 2 associated with the handset 4, in preparing to transmit voice data from the handset 4 onto the bus 1. Notably, bits 15 to 9 are unchanged, while the contents of bits 8 to 1 are shifted to the right by one bit. The content of bit 8 is not specified, as indicated by a cross 100 in the corresponding box. Bit 8 is then set equal to one, and the content of bit 0 is overwritten with zero. The bit value $b_0$ is lost during the shift operation. FIG. 2C illustrates the resultant two bytes. Each of the two bytes contains a 7-bit-wide partial word of the original sampled data word in bits 7 to 1, and the identifier of the partial word as the most or least significant part of the original data word in bit 0. These two data words are transmitted by the interface unit 2 onto the bus 1 in successive frames. It is typically specified by convention which of the partial words is transmitted first.

Following receipt of a byte transmitted onto the bus 1, the interface unit 2 associated with transmitter/receiver unit 5, which functions as a data sink, checks the value of the bit 0 to determine if the byte is the most significant or least significant byte of the transformed data word. By virtue of the convention, the interface unit 2 associated with transmitter/receiver unit 5 is able to reconstitute the data words in their original form, which is symbolically shown in FIG. 4.

Figure 2D:
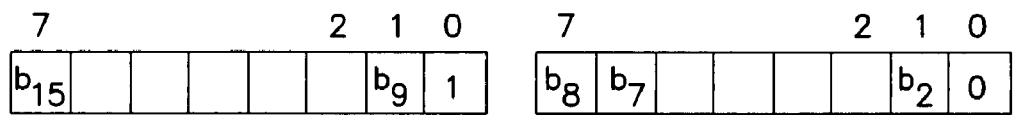
Figure 2E:
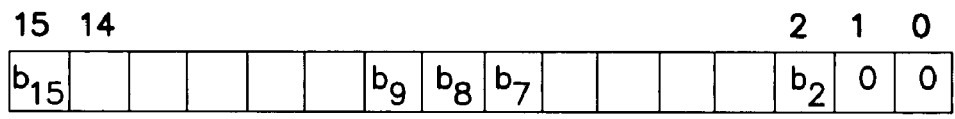

The interface unit 2 of the transmitter/receiver unit 5 receives the data transmitted on the bus 1 as received data illustrated in FIG. 2D in byte-by-byte format. The interface unit 2 of the transmitter/receiver unit 5 then processes the data illustrated in FIG. 2D to reconstruct the voice data. That is, referring to FIG. 2E, the interface unit 2 of the transmitter/receiver unit 5 shifts bits 7 to 1 of the least significant data word (i.e., contents $b_8$ to $b_2$) by one bit to the left. As a result, the original sequence of bits $b_{15}$ to $b_2$ as illustrated in FIG. 2A is reestablished. However, bits $b_1$ and $b_0$ are lost and are replaced by zeroes as shown in FIG. 2E. In this way, the transmitter/receiver unit 5 receives a complete data word at a frequency of 22.05 kHz.

Referring again to FIG. 1, the amplifier 6 receives general audio signals on four channels of the MOST bus 1 with the full-frame frequency of 44.1 kHz. So that the amplifier 6 can interact with the transmitter/receiver unit 5, which delivers data words at only half the frame frequency, the interface unit 2 of the amplifier 6 outputs each received data word of a voice signal twice to the amplifier 6. To prevent aliasing effects from the repeated output of the same value, a low-pass filter may be connected between the interface unit 2 and the amplifier 6. In many cases, utilization of such a filter requires no additional circuitry. Devices such as the amplifier 6, which require a voice signal with the full system clock pulse of 44.1 kHz, in practice generally are also used to process general audio signals with a specified transmission bandwidth of four channels. As a rule, such devices have digital signal processors to implement tone controls, which can also be configured as input filter stages.

Figure 3:
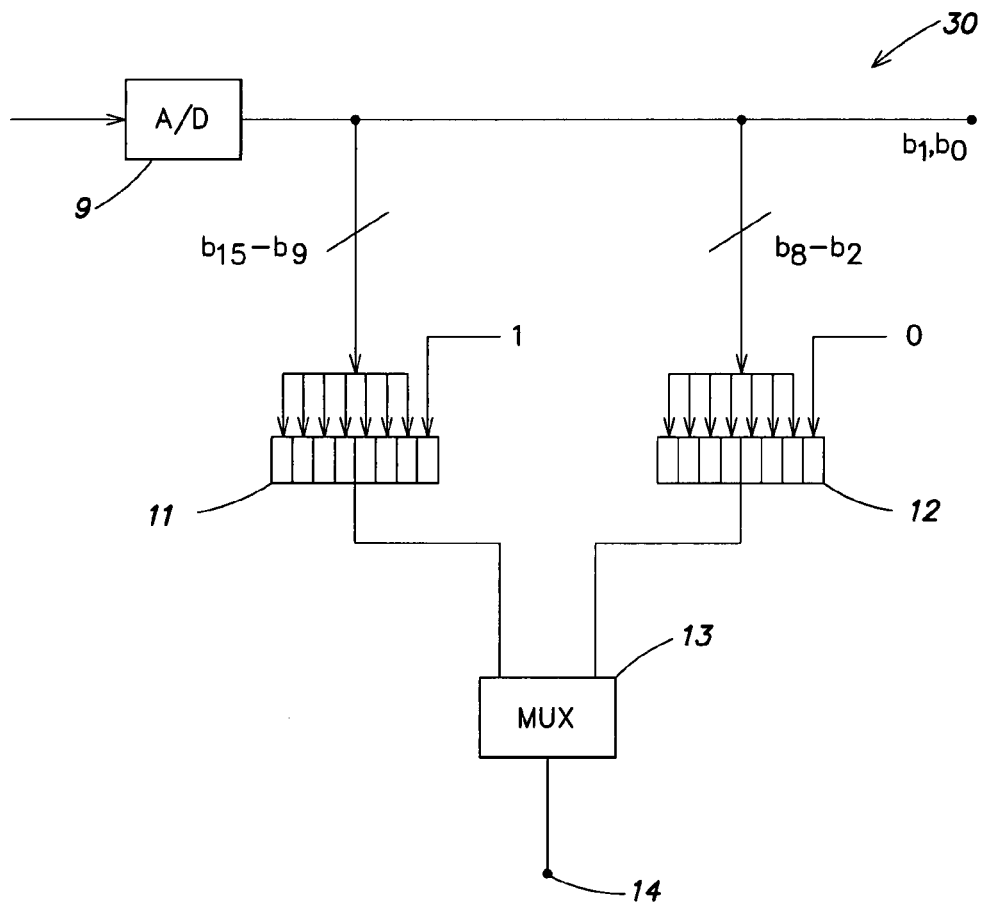
FIG. 3 is a block diagram of a data source.

Referring to FIG. 3, a data source 30 (e.g., the interface unit 2 associated with the handset 4) includes an analog-to-digital converter (ADC) 9, which receives an analog voice signal and outputs 16-bit-wide sampled data at a frequency of 22.05 kHz. The 16-bit-wide output signal of the ADC 9 is divided into bits $b_{15}$ to $b_9$ and $b_8$ to $b_2$, which are stored temporarily in the seven most significant bits of two shift registers 11, 12, respectively. The least significant bit of the shift register 11 is set constantly to logical level one, and the least significant bit of the shift register 12 is set to a logical zero. The outputs of the shift registers 11, 12 are connected to the inputs of a multiplexer 13. In each operating cycle of the ADC, the multiplexer 13 switches the output 14 once to the shift register 11 and once to the shift register 12. The data source thus outputs data bytes at a rate of 44.1 kHz, containing in alternation respectively the bits 15 to 9 and bits 8 to 2 of a digitized data word as illustrated in FIG. 2C.

Figure 4:
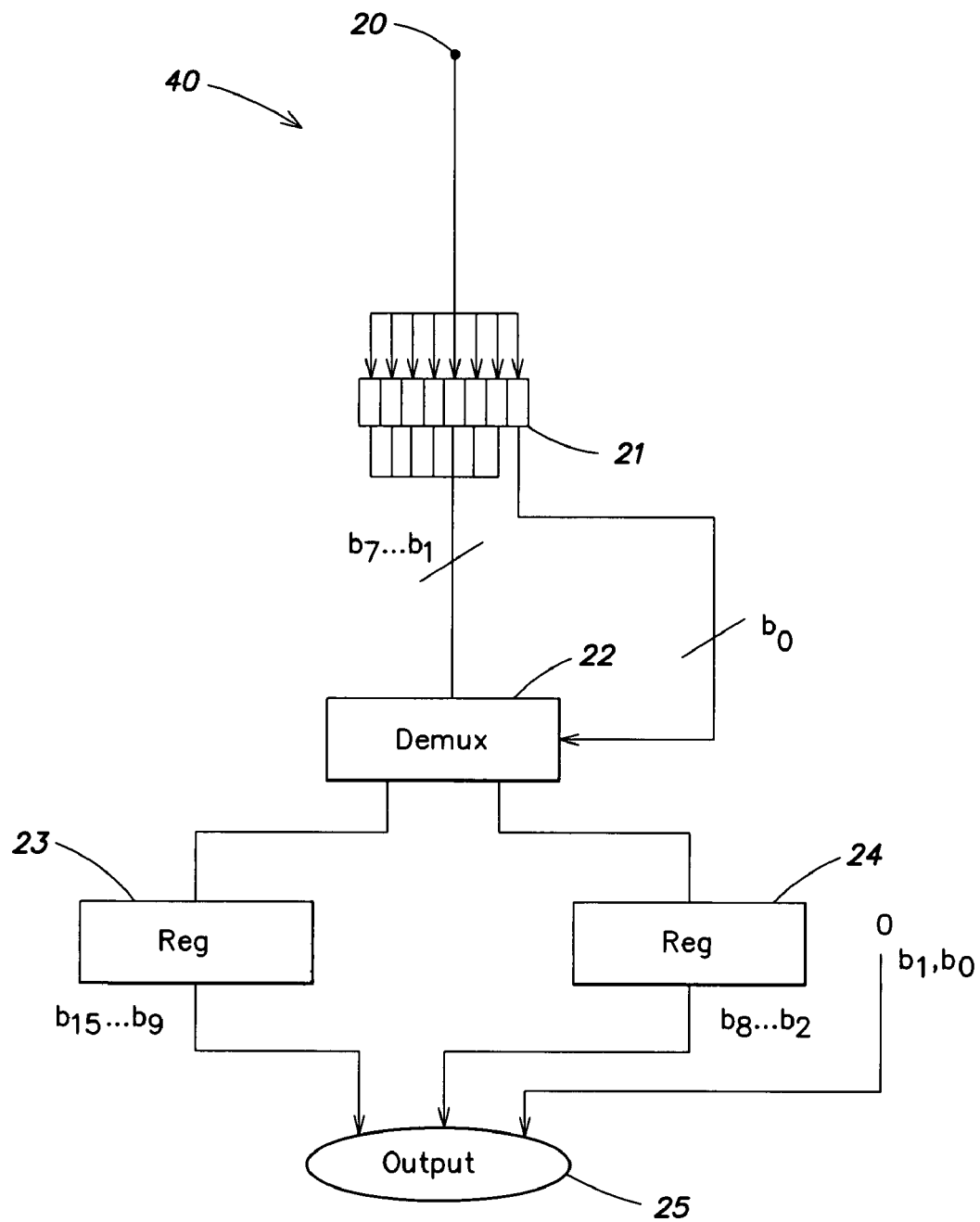
FIG. 4 is a block diagram of a data sink.

Referring to FIG. 4, a data sink 40 (e.g., the interface unit associated with the amplifier 6) includes a register 21 at its input 20, to buffer arriving bytes. The data inputs of a demultiplexer 22 are connected to the seven most significant outputs of the register 21. The least significant bit output of the register 21 is connected to the control input of the demultiplexer 22. Depending on the value of the least significant bit, the demultiplexer 22 outputs the received data to one of two registers 23, 24. The register 23 receives the most significant bits $b_{15}$ to $b_9$ of the 16-bit-wide output 25 to the data sink 40, while register 24 receives the other bits $b_8$ to $b_2$. Bits $b_1$, $b_0$ are set constantly to zero. The 16-bit-wide output 25 is illustrated in FIG. 2E.

The invention has been discussed in the context of voice transmission in a MOST network. However, one of ordinary skill in the art will recognize that the invention is applicable to the transmission of arbitrary digitized signals with a word width of "n" bits on one or more channels (depending on the ratio "a" of the operating frequency to the sampling frequency) of a transmission system with a width of "m" bits, where "m" is smaller than the word width "n."

Although the present invention has been shown and described with respect to several preferred embodiments thereof, various changes, omissions and additions to the form and detail thereof, may be made therein, without departing from the spirit and scope of the invention.

What is claimed is:

1. A data source and a data sink for transmitting a digitized data word with a word width of n bits therebetween in a data transmission system having a channel width of m bits, where n is greater than m, comprising:
   the data source that includes a source logic circuit that decomposes the digitized data word into at least two partial data words, each partial data word having a width less than m bits, where the source logic circuit shifts a number of bits of a first one of the at least two partial data words at least one bit position in a predetermined direction, where the source logic circuit adds an identifier bit into a predetermined bit position of each partial data word, where the identifier bit identifies each partial data word within the digitized data word, and where the data source transmits the at least two partial data words to the data sink over the data transmission system; and
   the data sink receives the transmitted at least two partial data words and includes a sink logic circuit that recomposes the at least two partial data words into the digitized data word with a word width of n bits in accordance with the identifier bit for each partial data word, where the sink logic circuit shifts the number of bits of the first one of the at least two partial data words at least one bit position in a direction opposite that of the predetermined direction that the source logic circuit shifted the first one of the at least two partial data words.

2. The data source and data sink of claim 1, where the source logic circuit includes a shift register that shifts the number of bits of the first one of the at least two partial data words at least one bit position in the predetermined direction.

3. The data source and data sink of claim 1, where the sink logic circuit includes a shift register that shifts the number of bits of the first one of the at least two partial data words at least one bit position in a direction opposite that of the predetermined direction that the source logic circuit shifted the first one of the at least two partial data words.

4. The data source and data sink of claim 1, where the data transmission system comprises the Media Oriented Systems Transport (MOST) bus system.

5. The data source and data sink of claim 1, further comprising an analog-to-digital converter that converts an analog signal from a device connected to the data source into the digitized data word.

6. A data source for transmitting a digitized data word with a word width of n bits in a data transmission system having a channel width of m bits, where n is greater than m, the data source comprising:
   a source logic circuit that decomposes the digitized data word into at least two partial data words, each partial data word having a width less than m bits, where the source logic circuit shifts a number of bits of a first one of the at least two partial data words at least one bit position in a predetermined direction, where the source logic circuit adds an identifier bit into a predetermined bit position of each partial data word, where the identifier bit identifies each partial data word within the digitized data word.

7. The data source of claim 6, where the source logic circuit includes a shift register that shifts the number of bits of the first one of the at least two partial data words at least one bit position in the predetermined direction.

8. The data source of claim 6, where the source logic circuit shifts the number of bits of the first one of the at least two partial data words at least one bit position towards the least significant bit position of the first one of the at least two partial data words.

9. The data source of claim 6, where the source logic circuit adds the identifier bit into a least significant bit position of each partial data word.

10. The data source of claim 6, further comprising an analog-to-digital converter that converts an analog signal from a device connected to the data source into the digitized data word.

11. The data source of claim 6, where the data transmission system comprises the Media Oriented Systems Transport (MOST) bus system.

12. The data source of claim 6, where each partial data word has a width of m-1 bits.

13. A data sink for receiving a transmitted digitized data word with a word width of n bits in a data transmission system having a channel width of m bits, where the transmitted digitized data word comprises at least two partial data words each having a width less than m bits, where n is greater than m, the data sink comprising:
   a sink logic circuit that recomposes the at least two partial data words into the digitized data word with a word width of n bits in accordance with an identifier bit for each partial data word, where the identifier bit is located in a predetermined bit position of each partial data word, where the sink logic circuit shifts the number of bits of a first one of the at least two partial data words at least one bit position in a predetermined direction.

14. The data sink of claim 13, where the sink logic circuit includes a shift register that shifts the number of bits of the first one of the at least two partial data words at least one bit position in the predetermined direction.

15. The data sink of claim 13, where the sink logic circuit shifts the number of bits of the first one of the at least two partial data words at least one bit position towards the most significant bit position of the first one of the at least two partial data words.

16. The data sink of claim 13, where the data transmission system comprises the Media Oriented Systems Transport (MOST) bus system.

17. The data sink of claim 13, where the identifier bit is located in a least significant bit position of each partial data word.

* * * * *

UNITED STATES PATENT AND TRADEMARK OFFICE
CERTIFICATE OF CORRECTION

PATENT NO. : 7,280,051 B2  
APPLICATION NO. : 11/480758  
DATED : October 9, 2007  
INVENTOR(S) : Stiegler et al.

Page 1 of 1

It is certified that error appears in the above-identified patent and that said Letters Patent is hereby corrected as shown below:

Column 2 line 44, after "8" insert --of--

Signed and Sealed this

Twenty-seventh Day of November, 2007

JON W. DUDAS  
*Director of the United States Patent and Trademark Office*